United States Patent [19]
Johnson et al.

[11] 3,939,116
[45] Feb. 17, 1976

[54] SELF-SUPPORTED, ORIENTED HIGH-PERFORMANCE FILMS HAVING MINIMAL THERMAL DISTORTION PROPERTIES

[75] Inventors: Burnett H. Johnson; Don J. Henderson, both of Baytown, Tex.

[73] Assignee: Exxon Research and Engineering Company, Linden, N.J.

[22] Filed: May 14, 1973

[21] Appl. No.: 359,836

[52] U.S. Cl. 260/47 CB; 260/77.5 CH; 260/77.5 R; 260/77.5 C; 260/77.5 AA; 260/77.5 A; 264/235; 264/288; 264/290 N
[51] Int. Cl.² ........................................ C08G 18/00
[58] Field of Search .. 260/77.5 CH, 77.5 R, 77.5 C, 260/77.5 AA, 77.5 A, 47 CB

[56] References Cited
UNITED STATES PATENTS

| | | | |
|---|---|---|---|
| 3,455,879 | 7/1969 | Gay et al. | 260/65 |
| 3,642,709 | 2/1972 | Agolini et al. | 260/65 |

*Primary Examiner*—M. J. Welsh
*Attorney, Agent, or Firm*—David A. Roth

[57] ABSTRACT

Highly unusual and useful novel high-performance, oriented, lowcrystalline, essentially heterocyclic structures, e.g. films, are prepared from certain novel and important process sequences. These structures, e.g. films and fibers, possess a unique combination of minimal shrinkage at high temperatures, after orientation, coupled with negligible coefficent of expansion over an unusually wide temperature range.

9 Claims, No Drawings

SELF-SUPPORTED, ORIENTED HIGH-PERFORMANCE FILMS HAVING MINIMAL THERMAL DISTORTION PROPERTIES

CROSS-REFERENCE TO RELATED APPLICATIONS

There are no other related applications to this one. But it is to be noted that the polyparabanic acid heterocyclic polymer, which is the preferred polymer used to make the unique structures of the invention, is disclosed in a series of patents which are owned by the common assignee. These are U.S. Pat. Nos. 3,591,562; 3,547,897; 3,661,859; 3,684,773; 3,637,843; and 3,635,905.

BACKGROUND OF THE INVENTION

In general, unoriented polymers have a relatively large coefficient of thermal expansion, as compared to other materials such as inorganics. Furthermore, for many applications, e.g. film and fiber, most polymers are not strong enough to be used without orientation. But orientation causes an adverse effect on the resistance of a polymeric structure to permanent irreversable shrinkage. These shrinkage effects are so pronounced that they obscure the effect of reversable thermal expansion.

Irreversable shrinkage as used herein means thermally irreversable permanent dimensional change from a stressed condition as opposed to contraction which is thermally reversable.

Structures such as fibers and films having exceptional thermal dimensional stability would be exceedingly useful for use as magnetic tape bases, circuit boards, substrates for miniaturized electronics, fibers for highly accurate measurements and the like.

Polymeric materials with this unique characteristic would also be extremely useful for reinforcing fillers and for use in those situations where dissimilar materials are in contact with each other and are subject to wide variations in thermal cycling. Examples of this type of combination would be metallized polymer foils and laminates containing layers of different types of polymers and other materials.

The thermal expansion coefficient is defined at temperature T as $\alpha_T$, where $$\alpha_T = \left( \frac{1}{L_o} \times \frac{\Delta L}{\Delta T} \right),$$

Where $L_o$ is the initial sample length, and $\Delta L$ is the change in sample length which occurs during the change in temperature, $\Delta T$.

Isolated instances of specific *unoriented* polymer structures which show a zero coefficient of expansion are described in U.S. Pat. Nos. 3,455,879 and 3,642,709. These are formed from specific polymer compositions which are totally unrelated to the ones of this invention.

SUMMARY OF THE INVENTION

Controlled orientation process for producing high-temperature resistant polymer articles showing unusual thermal dimensional stability, including a low or zero shrinkage at high temperatures with about zero coefficient of expansion over a wide temperature range, particularly near room temperature.

DESCRIPTION OF THE PREFERRED EMBODIMENTS

The unique structures, e.g. films and fibers, of the invention, are obtained by expressly subjecting high temperature performance precursor structures to certain critical processing techniques in order to develop the unusual thermal dimensional stability.

Thus, total dimensional stability as used herein refers not only to coefficient of thermal expansion attributes, but also comprises an additional but highly important property component. That is, these structures of the invention are composed of high temperature resistant polymers which have a $T_g$, i.e., a glass transition temperature, which is extremely high relative to the normal environment in which they are used and processed.

Thus, a typical high-softening temperature polymer to be used in the structures of the invention would have a $T_g$ greater than 100° C, preferably greater than 150°, and most preferably 200° C. or equivalent ° F. Those will be referred to herein as high softening temperature polymers.

High glass transition temperatures are extremely significant. The reason is that the polymers of this invention which can be suitably oriented are highly resistant to the shrinkage at temperatures above room temperature which is ordinarily associated with highly oriented films or fibers as they approach within 50° C of their respective $T_g$.

Shrinkage is ordinarily so pronounced at this temperature for low $T_g$ polymers that it tends to make the other thermal dimensional characteristic, e.g., thermal expansion coefficients, insignificant. Furthermore, such oriented structures in the art possess high shrinkage stresses. These result in those serious thermal distortions at relatively low temperatures which are ordinarily referred to as permanent irreversable "shrinkage".

It is only when a polymer with an exceptionally high glass transition temperature is properly oriented according to the techniques of the invention to eliminate irreversable shrinkage that the phenomenon of low or even zero coefficient of thermal expansion can be isolated and observed as being not only a novel thermal dimensional stability component, but an exceedingly useful property even at room temperature and above.

Heretofore it was known that some reduction in the magnitude of $\alpha$ in the direction of orientation is achieved. However, such reduction of $\alpha$ is a relatively small percentage of the total value of $\alpha$.

It is known that high performance films, fibers and other structures can be made from various heterocyclic polymers such as those described in U.S. Pat. No. 3,661,859, which disclosure is incorporated herein in its entirety by reference. Those particular polymers are referred to as 1,3-imidazolidene-2,4,5-trione-1-diyl polymers and are especially preferred for the purpose of this invention. They are also referred to as polyparabanic acids which term is shortened to PPA which will be used hereinafter.

The repeating heterocyclic ring structure of this preferred polymer is shown as follows:

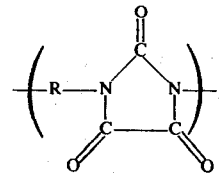

$n$, where $n$ is a number from 10 to 1,000,000.

Related to PPA but different high performance polymers that can be used are polyhydantoins which have been described in the art. See, for instance, Netherlands Pat. No. 6,809,916, Belgium Pat. No. 723,772, German Pat. Nos. 1,807,742; 1,805,955; 1,812,002; 1,812,003; 1,905,367. Polyimides are well known and are described in such publications as British Pat. No. 1,240,665, U.S. Pat. Nos. 3,486,934, 3,536,666, French Pat. Nos. 1,488,924, 1,549,101, Russian Pat. No. 218,424, German Pat. No. 1,301,114, Netherlands Pat. No. 7,001,648 and the like.

The detailed preparation of these polymers and solutions of these polymers in suitable solvents are set forth in the above-recited patents and others also in the art, and therefore need not be repated here except as is necessary to understand the invention.

The preferred heterocyclic polymers which are used to form the structures of the invention are characterized by high temperature thermal stability, organic petroleum solvent resistance, relative high tensile modulus, tensile strength and ultimate elongations with low shrinkage at at high temperatures.

Furthermore, they have relatively high dielectric strengths. These properties have been found by the present inventors and their co-workers to offer outstanding commercial advantages when used as films in flexible circuitry for use in air bag circuits, light monitoring circuits, telephone circuits because of their ability to be soldered. They also are useable for magnetic tapes (where good dimensional stability at high temperatures is required), for fibers, such as tire cord fibers, where high tenacity and modulus are required, for moldings for electrical connectors and bearings where high temperatures are required, magnetic wire insulation, coatings for ship cables and cookware, glass fabrics, industrial belts and the like.

In general, the heterocyclic polymers of the invention will comprise sufficient repeating units of a special heterocyclic ring structure to be solid at room temperature.

The heterocyclic ring will be 5-membered and will contain carbon, and nitrogen linkages wherein at least two of the carbon linkages will be carbonyl groups, i.e.

which are separated by a nitrogen atom.

The preferred heterocyclic ring can be schematically represented as

wherein X is selected from the group consisting of:

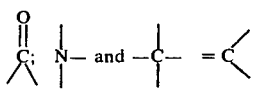

and wherein a minimum of two carbonyl groups are present and separated by a nitrogen atom.

Examples of Heterocyclic rings which fall in this class are:

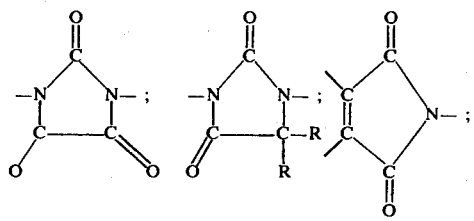

where R is H or a $C_1$ to $C_{50}$ hydrocarbon.

Other suitable polymers have repeating units, as follows:

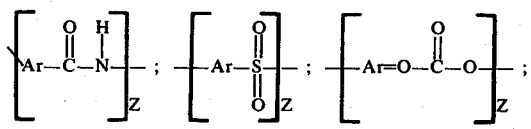

wherein Z is a number from 10 to 500, preferably 50 to 200, wherein some of the units can be aliphatic comonomers.

Thus in general the polymers which are suitable for use in the process and oriented structures of the invention are aromatic-based, high-temperature polymers selected from the group consisting of aromatic PPA, aromatic polyhydantoins, aromatic polyamides, aromatic polyamideimides, aromatic poly(carbonates) and aromatic polysulfones.

In general, the high performance polymers disclosed herein, particularly aromatic PPA homopolymers are oriented as low as 40° C. below their glass transition temperature, $T_g$, or at their $T_g$, or slightly above their $T_g$ (not more than 10° C. above) (depending on stretch rate) followed by rapid quenching to produce a highly oriented anistropic film. As is typical of oriented films, the mechanical properties are greatly enhanced by orientation. Thermal expansion in the orientation direction can be reduced drastically and even made negative by the proper control of such orientation.

A negative $\alpha$ means that the sample actually is reversable — contracts on heating and expands on cooling.

The magnitude and sign of $\alpha$ are determined by the amount of orientation achieved which is controlled primarily by the factors of (a) drawing temperature, (b) percent elongation, (c) rate of draw, and (d) rapidity of quench.

The orientation techniques described herein are applicable for other PPA homopolymers, copolymers as well as blends containing PPA, and for other heterocyclic polymers. Orientation of other structures such as fibers extruded and molded sheets will also respond in a similar manner to the cast films described in the examples herein.

Generally speaking, relationships of birefringence to $\alpha$(coefficient of thermal expansion) are shown in the following Table.

|  | Birefringence | $\times 10^{-5}$ deg.$^{-1}$ |
|---|---|---|
| General | .05 to 0.2 | +1.6 to −3 |
| Preferred | .06 to 0.18 | +2 to −2 |
| Most Preferred | .07 to 0.15 | +0.8 to −0.5 |

Thus the essence of the invention is to control the particular process conditions in order that the resulting structure has an $\alpha$ or birefringence falling within the ranges expressed above.

The variable process conditions which can be controlled and selected in order to obtain the desired $\alpha$ values comprise:

a. temperature of orientation or stretching;
b. rate of orientation;
c. ultimate percent of stretch in final product;
d. a relatively rapid quench.

The details and ranges governing these process variables are discussed below.

The temperature of orientation will, of course, vary from polymer to polymer depending on that polymer's particular glass transition temperature.

In general, the temperatures of orientation will range from approximately 40°C. below the $T_g$ to about 10°C. above the $T_g$, preferably 20°C. below $T_g$ to about 5°C. above $T_g$ and most preferably about 10°C. below $T_g$ and up to 2°C. above $T_g$.

For the preferred PPA polymers of the invention, the temperature range for orientation will be about 250° to 300° C., preferably 270° to 295° C., and most preferably 270° to 292° C.

Generally, the rate of stretch measured in percent elongation per minute, i.e. PPM, will vary from about 10 to 10,000, preferably 75 to 5,000, and most preferably 100 to 2,000.

The ultimate percentage of stretch or elongation in the final structural article will vary from 25 to 500% increase over initial dimension, preferably 50 to 200%, and most preferably 75 to 150% increase over initial dimension.

The essence of the present invention is the unique process for producing novel products with almost perfect thermal dimensional stability under anhydrous conditions. It has also been found that other factors besides thermal ones influence the total or overall dimensional stability of a structure prepared according to this invention. Thus, it has been disdovered that an extremely important factor is the effect of sorbed water vapor. Since the high performance polymers comprising the structures which are the substance of this invention are generally polar, it is normal that they will absorb small quanitites of water. Hitherto, the effect of that water had not been known to create an effect on the total dimensional stability of the oriented film.

As a result of the observations detailed herein it has been discovered that there is a hydroscopic coefficient of expansion as well as a pronounced hydroscopic effect on the thermal coefficient of expansion. Ideally, for maximum dimensional stability, the hydroscopic factors influencing coefficients of expansion must be inter-related with these other coefficients of expansion in order to arrive at a balance point where there is a minimal dimensional change effect created by the factors of water vapor and heat.

In order to further demonstrate the invention, a number of films incorporating the unique process techniques and therefore exemplifying the novel films of this invention were prepared in the following series of examples. In these examples, expansion measurements (and determinations) were made on a Perkin-Elmer Thermal Mechanical Analyzer. The expansion coefficient was calculated by determining the slope at $T_1$ on an L vs. T plot and then dividing this by the original length, $L_0$ at $T_0$.

Oriented, cast films were first subjected to a preheat cycle, i.e. annealing, and cooled before an $\alpha$ measurement scan. This was done to remove any residual shrinkage effects that would superimpose on thermal expansion effects.

EXAMPLE 1

A dry PPA film cast from a DMF solution of PPA polymer made from diphenyl ether diisocyanates according to the techniques described in U.S. Pat. No. 3,661,859, which patent is hereby incorporated by reference in its entirety, was oriented as follows:

The film was rapidly stretched 75% at 240° C. at a rate of 100% elongation per minute in a hot air oven and quenched in the drawn state by exposing to ambient air. The stretched film was heat-treated (annealed and dried) for 30 min. at 150° C. Permanent nonrecoverable shrinkage of 0.2% on this first heat cycle was observed. An $\alpha$(OP) measurement was made with results as follows:

$\alpha_{25}(OP) = -1.02 \times 10^{-5}$ deg. $^{-1}$
$\alpha_{25}(TD) = +5.4 \times 10^{-5}$ deg. $^{-1}$ When the results are reported, OD indicates the orientation or draw direction and TD indicates the planer transverse direction.

The subscript on $\alpha$ indicates the temperature at which $\alpha$ is quoted.

Although only values of $\alpha$ calculated near room temperature were tabulated, these novel coefficient of expansion characteristics apply to all temperatures below $T_g$, but their particular magnitude is temperature dependent as it is for normal materials. For example, this particular PPA film exhibits a negative $\alpha$ from the lowest measured temperature of −151° C. to over +270° C. This is apparent from L vs. T comparisons over a wide spectrum where $\alpha$ is seen to become more negative as the temperature increases.

EXAMPLE 2

The film of Example 1 was rapidly stretched 150% at 240° C. at a rate of 75% elongation per minute in the apparatus described in Example 1 and quenched in ambient air in the drawn state. The resulting $\alpha$ is:

$_{25}(MD) + -1.4 \times 10^{-5}$ deg. $^{-1}$

An unstressed portion of this oriented film was held at 202° C. overnight and showed no shrinkage (0.1%) even at this high temperature. No significant amount of orientation was lost by this heat treatment as indicated by the retention of the negative value and corresponding birefringence value after annealing.

EXAMPLE 3

In order to demonstrate the utility of this invention for aromatic polyimides, a "Kapton" 500H polyimide film obtained from E. I. duPont de Nemours & Co., Inc., Film Dept., Wilmington, Delaware 19898 was uniaxially oriented by stretching at 290° C. at a rate of 1000% elongation per minute followed by rapid air quench at ambient temperatures.

The linear thermal expansion coefficient in the orientation direction (OD) at 25°C. was $-0.24 \times 10^{-5}$ in/in/°C. for 100% stretch. These values are to be compared with one of $+1.85 \times 10^{-5}$ in/in/°C. (note sign) at 25°C. (Machine Direction) for the film as received and analyzed without orientation. This measurement on the unstretched film was in good agreement with the literature value (DuPont Bulletin H-2) of $2.0 \times 10^{-5}$ in/in/°C.

The birefringence, after orientation, was very large, i.e. greater than 0.15. When the oriented film was held in an unrestrained mode at 150°C. for 7.5 hours in helium, it underwent a relatively large permanent shrinkage of 1.45%, but still retained a negative (OD) of $-1.1 \times 10^{-5}$ in/in/°C.

EXAMPLE 4

Polyhydantoin film (I Do 4089 obtained from Farbenfabreken Bayer AG) of the general structure

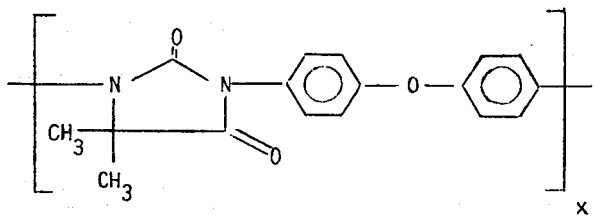

as determined by NMR and infrared analysis was oriented in the apparatus and using the technique described above in Example 1 by stretching to a 100% elongation at 290°C. at a stretching rate of 1000% per minute and immediately quenched in air. The $\alpha_{75}$ before orientation was $+5.45 \times 10^{-5}$ in/in/°C. After orientation $\alpha_{75}$(MD) was $-0150 \times 10^{-5}$ in/in/°C. Birefringence was very high at 0.1248.

Examples 3 and 4 demonstrate the techniques of the invention can be used to prepare dimensionally stable films from high performance aromatic polyamides, and polyhydantoins in addition to those from PPA.

It should be noted that biaxially oriented films can also be prepared which have comparable unique and unusual dimensional characteristics.

What is claimed is:

1. An oriented shaped article formed from a high softening temperature aromatic-containing polymer or copolymer having a thermal co-efficient of expansion ($\alpha$) of from $+1.6$ to $-3.0 \times 10^{-5}$ deg$^{-1}$ and for PPA a birefringence value of from 0.05 to 0.2 and wherein said article has been elongated at least 25% more than its non-oriented value in one dimension.

2. An article according to claim 1 which is a fiber or filament.

3. An article according to claim 1 which is a molded sheet.

4. An article according to claim 2 wherein $\alpha$ is about $+2.0$ to $-2.6 \times 10^{-5}$ deg.$^{-1}$, the birefringence is from 0.05 to 0.2 and the article has been elongated at least 25% more than its non-oriented value in the machine direction and wherein said article is in a substantially anhydrous condition or in a constant humidity condition.

5. An article according to claim 1 wherein said polymer is homopolymer or copolymer PPA.

6. An article according to claim 1 wherein said polymer is a homopolymer or copolymer polyimide.

7. An article according to claim 1 wherein said polymer is homopolymer or copolymer polyhydantoin.

8. An article according to claim 1 wherein $\alpha$ is about $+2.0$ to $-2.0$.

9. An article according to claim 1 which has been prepared from a cast film.

* * * * *